J. W. ZIMMERMAN.
Friction Feed-Clutch for Circular-Saw Mills.
No. 8,339. Reissued July 16, 1878.
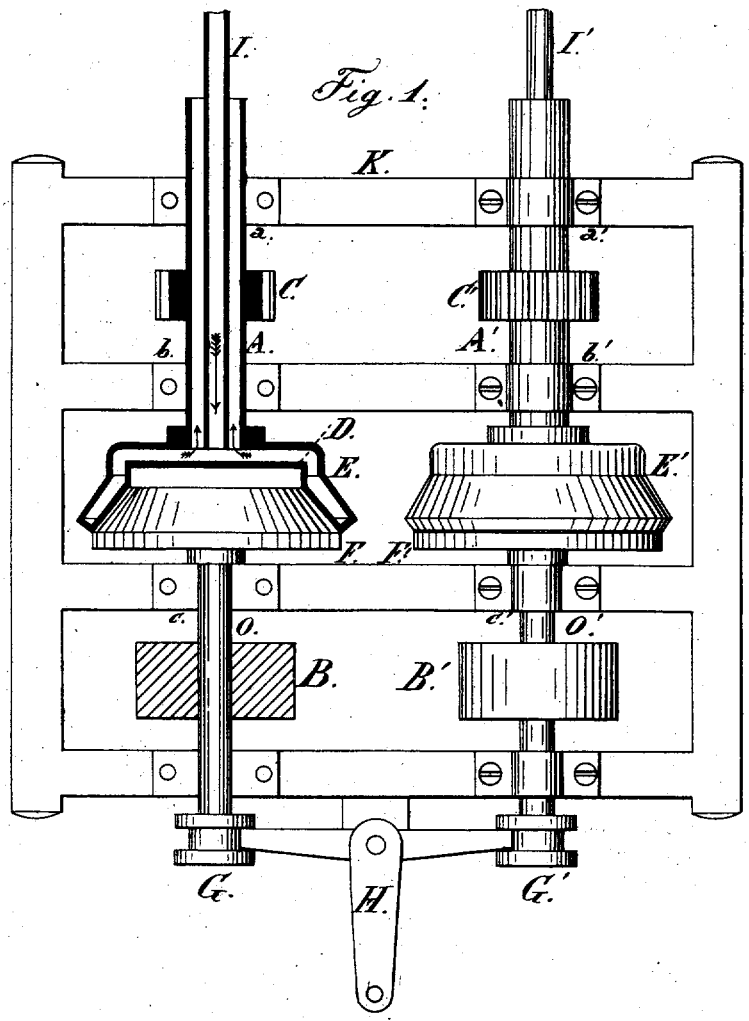
WITNESSES:
Albert Cunningham
James G. Flanders
INVENTOR:
Joseph W. Zimmerman,
Per C. H. Bottum
his attorney
N. PETERS, PHOTO-LITHOGRAPHER, WASHINGTON, D. C.

UNITED STATES PATENT OFFICE.

JOSEPH W. ZIMMERMAN, OF MANISTEE, MICHIGAN.

IMPROVEMENT IN FRICTION FEED-CLUTCHES FOR CIRCULAR-SAW MILLS.

Specification forming part of Letters Patent No. 182,340, dated September 19, 1876; Reissue No. 8,339, dated July 16, 1878; application filed May 20, 1878.

*To all whom it may concern:*

Be it known that I, JOSEPH W. ZIMMERMAN, of Manistee, in the county of Manistee and State of Michigan, have invented certain new and useful Improvements in Gig and Feed Works for Circular-Saw Mills; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to that class of feed and gig works for saw-mills which employ two shafts, revolving in opposite directions, and capable of being alternately connected with the carriage, so as to drive it forward or backward at will. I employ a friction clutch or gearing to make this connection, and an improved friction-clutch for this purpose constitutes my invention.

The accompanying drawing is a top view of my invention, in which the right-hand pulley, clutch, and shafts are shown as used. The left-hand clutch and shaft are shown as divided by a horizontal axial section.

A A′ are tubular shafts revolving in boxes *a a′ b b′*. To these shafts are attached the overhanging hollow concave friction-wheels E E′, usually formed of cast-iron, and containing the chamber D, which communicates freely with the hollow shaft.

F F′ are overhanging coniform friction-wheels fitting into wheels E E′, as shown in the drawing, and usually formed of paper, which my experience thus far shows to be the best material. Wheels F F′ are attached to shafts O O′, which revolve in and slide longitudinally in boxes *c c′* and *d d′*.

By means of the double bell-crank lever H, which is inserted in grooves in pulleys G G′, wheels F and F′ can be thus easily brought into contact with wheels E E′.

B B′ are wheels attached to and serving to drive shafts O O′. C C′ are toothed pinions attached to shafts A A′, and working in a rack on the under side of the carriage.

My invention operates as follows: By belts upon pulleys B and B′ or other suitable device shafts O O′ are driven in opposite directions. Pressure upon lever H throws wheel F into or against wheel E, and motion is thereby communicated to shaft A, which, by means of the pinion C, drives the carriage forward. Pressure upon the lever H in the opposite direction throws wheels F′ and E′ into gear, and in a similar manner gives a backward motion to the carriage. When no pressure is made upon the lever H, the shafts A and A′ and the carriage are at rest. The tubes I I′ communicate at their outer ends with a reservoir or pump of cold water, which flows through them into the hollow chamber D and out of it through the space between the tube I or I′ and the interior of the tubular shaft A or A′. This serves to keep pulleys E and E′ cold, however great the friction arising from the contact of the pulleys. The peculiar form of pulleys E and F makes them self-fitting, and gives great adhesion when they are in contact. The employment of two separate shafts, O and A, or O′ and A′, and overhanging pulleys, prevents the introduction of oil from the shaft-bearings between the friction-surfaces, and thus obviates a frequent source of trouble with other forms of friction-clutch.

By my peculiar method of applying water to the friction-whee[illegible] and wheel F are kept cool, however ra[illegible] sudden the changes of motion may be, [illegible]he wheel F is not wet, warped, or worn, [illegible] would be if water were applied to the [illegible] or of wheels E or F. These statements a[illegible] also to wheels E′ and F′.

I am aware that friction clutches or gearings have been used for the same purpose heretofore. I by no means claim such, broadly; but

I claim—

1. An overhanging friction-wheel provided with an interior chamber for the admission of water to cool the same, while preventing the contact of water with the friction-surfaces, substantially as and for the purposes set forth.

2. The combination of a hollow friction-wheel with a hollow shaft communicating therewith, as and for the purposes set forth.

3. The friction-wheel E, provided with a chamber, D, and tubular shaft A, as and for the purposes set forth.

4. The combination of the conical overhanging friction-wheel F, the overhanging chambered concave friction-wheel E, tubular shaft A, and water-pipe I, substantially as and for the purposes set forth.

In testimony that I claim the foregoing I hereto set my hand in presence of two witnesses.

JOSEPH W. ZIMMERMAN.

In presence of—

E. E. BENEDICT,

D. B. BUTLER.